(12) United States Patent
Eslambolchi et al.

(10) Patent No.: US 6,614,968 B1
(45) Date of Patent: Sep. 2, 2003

(54) SPARE FIBER MONITORING ARRANGEMENT

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 58 days.

(21) Appl. No.: 10/137,880

(22) Filed: May 2, 2002

(51) Int. Cl.$^7$ ................................. G02B 6/44
(52) U.S. Cl. .................. 385/100; 385/112; 385/24
(58) Field of Search ................. 385/100–114, 24, 385/39, 42; 359/110, 161, 173, 124

(56) References Cited

U.S. PATENT DOCUMENTS

| | | | |
|---|---|---|---|
| 4,397,551 A | 8/1983 | Bage et al. | |
| 4,445,086 A | * 4/1984 | Bulatao | ........ 324/66 |
| 4,866,265 A | * 9/1989 | Hohne | ........ 250/227 |
| 4,875,772 A | 10/1989 | Gentile | |
| 4,994,675 A | * 2/1991 | Levin et al. | ........ 250/551 |
| 5,093,568 A | 3/1992 | Maycock | |

* cited by examiner

Primary Examiner—Lynn D. Feild
Assistant Examiner—Son V. Nguyen

(57) ABSTRACT

An arrangement for monitoring the integrity of the spare fibers within a fiber optic cable includes a transmitter unit at a first location and a receiver unit at a second location (which may be upwards of 50 miles from the first location). A test signal is launched by a laser source in the transmitter unit along each spare fiber, and a set of threshold detectors is used at the receiver unit to monitor the received signal level. If the level of a received test signal along a spare fiber drops below a predetermined level (or if the fiber fails completely), an alarm signal is generated to alert a technician regarding the need to repair or replace the failed spare fiber. The alarm signal may be a "local" alarm signal generated at the second/receiver location or may be communicated back to the first/transmitter location as a "remote" alarm signal.

11 Claims, 2 Drawing Sheets

SPARE FIBER MONITORING ARRANGEMENT

TECHNICAL FIELD

The present invention relates to fiber optic transmission systems and, more particularly, to an arrangement for monitoring the qualities of spare fibers within a fiber optic cable.

BACKGROUND OF THE INVENTION

Fiber optic cables as used in most communication networks have fiber counts that range from twenty-four to upwards of 216 individual fibers. Not all of these fibers are ever in service at the same time, as some will be designated as "spare" fibers within the cable, and available as replacements if and when other fibers begin to fail. There are various methods well-known in the art that are used to continuously test and monitor the fibers that are actively being used for transmission. One well-known method uses a method referred to as optical time-domain reflectometry (OTDR) which is, in effect, a "laser radar" system which tests the conditions of an active fiber by injecting laser beam pulses into the fiber at one point and then receiving returned reflections of the pulses. The time elapsed between the sending and the receiving, as well as the pulse shape, is used to diagnose the condition of the fiber and determine when the fiber has failed.

During normal operating conditions, however, the spare fibers are left "open"; that is, not connected to any equipment and, therefore, these spare fibers are never monitored. When a need arises to use one of the spare fibers, a technician must travel to the location where the spare fiber is to be spliced in place of a failed fiber and use the OTDR method (or any other appropriate method) to first verify the integrity of the spare fiber. At times, the spare fibers themselves are defective and will require maintenance prior to connecting them to the communication equipment.

Thus, a need remains for a method of providing a continuous monitor of the condition of spare fibers within a fiber optic cable.

SUMMARY OF THE INVENTION

The need remaining in the art is addressed by the present invention, which relates to fiber optic transmission systems and, more particularly, to an arrangement for monitoring the qualities of spare fibers within a fiber optic cable.

In accordance with the present invention, a spare fiber monitor system includes a transmitter portion at a first location including a plurality of laser sources for generating a plurality of test signals. The "spare" fibers are then coupled into the transmitter and the test signals are launched along these fibers. A receiver portion is located a predetermined distance away (such as, for example, at the next regenerator location) for receiving the plurality of test signals propagated along the spare fibers. Threshold detectors (or any other suitable monitoring arrangement) are used to analyze the power level of the received test signals. The receiver includes an alarm indicator which will be activated when one (or more) of the spare fibers experiences a failure. Thus, a technician can either repair the failed fiber or (at a minimum) not use the failed spare fiber when the need arises to replace a failed transmission fiber with a spare fiber.

In one embodiment of the present invention, the alarm indicator at the receiver is used in a "local alarm" mode to alert a technician at the remote location regarding the failure of the spare fiber. Alternatively, the alarm indicator may include a telemetry capability to send an alert signal back to the transmitter to be dealt with by a technician at the transmitter location.

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
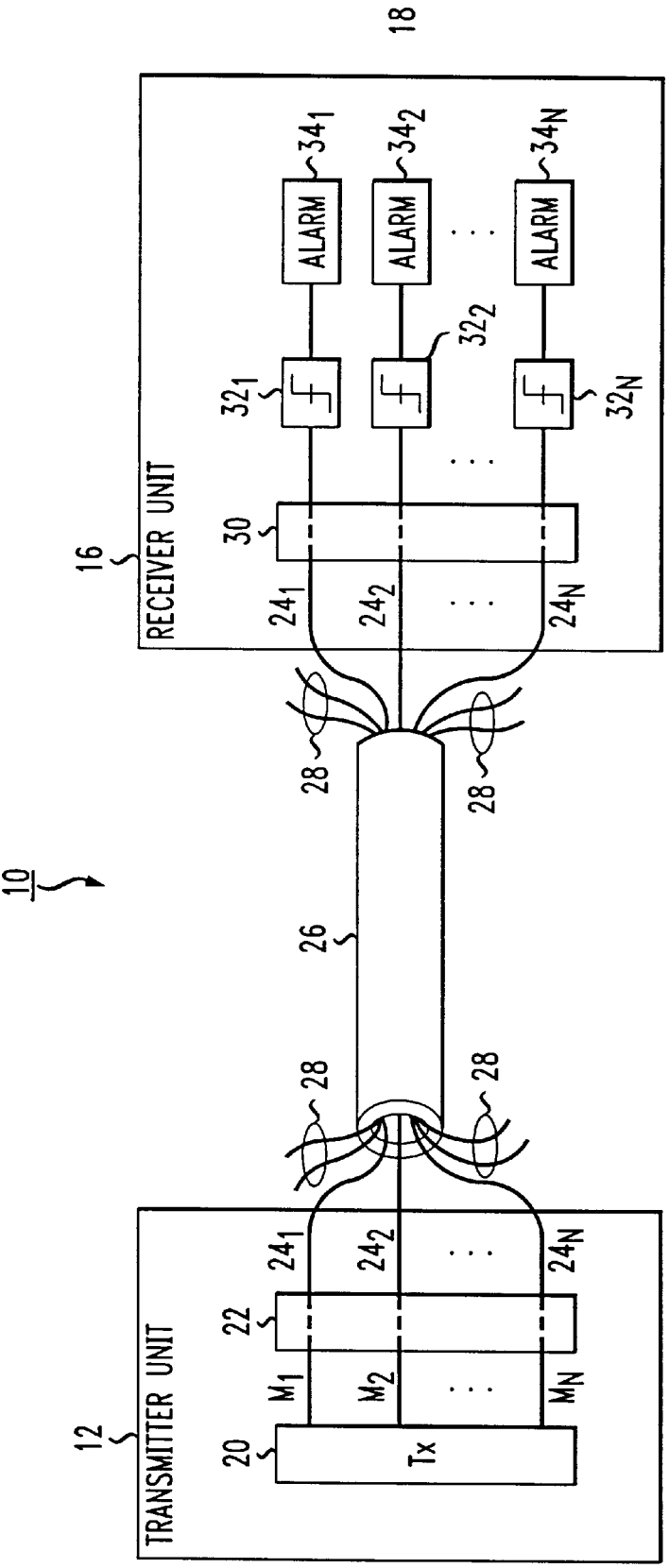
FIG. 1 illustrates an exemplary spare fiber monitoring system of the present invention using a local alarm arrangement.

FIG. 1 illustrates an exemplary spare fiber monitor system 10 formed in accordance with the present invention. As shown, monitor system 10 includes a transmitter unit 12 disposed at a first location 14, where first location 14 may comprise a regenerator station. A receiver unit 16 is disposed at a second location 18, remote from first location 14, where second location 18 may be another regenerator station. In general, regenerator stations may be upwards of 50 miles apart, so the power launched into the spare fibers from transmitter unit 12 needs to be sufficient to propagate along a distance of at least 50 miles.

Referring to FIG. 1, transmitter unit 12 is shown as comprising a laser source 20 which may comprise a plurality of N separate laser sources for supplying monitoring signals to a plurality of N spare fibers. Various arrangements for "sharing" laser sources among the plurality of N spare fibers may be used (including the use of 1×M splitters, for example, where $1 < M \leq N$), as long as sufficient power level is launched into each fiber. A connector board 22 is also included in transmitter unit 12, where the plurality of N monitoring signals from laser source 20 are applied as inputs to board 22, designated in FIG. 1 as $M_1, M_2, \ldots, M_N$. In accordance with the present invention, a plurality of spare fibers $24_1, 24_2, \ldots, 24_N$ from a fiber optic cable 26 are also coupled to connector board 22 and coupled in a one-to-one relationship (as shown) with the plurality of monitoring signals generated by laser source 20. The various remaining communication fibers 28 within cable 26 are then connected (not shown) to various other fibers and/or sources of optical information for transmission along cable 26. Transmitter unit 12 may be powered by a stand-along battery system (e.g., 48V DC) or a conventional power supply (120V AC), and mounted as a test system within a rack at a regenerator location. Transmitter unit 12 may be configured to provide continuous application of the plurality of monitoring signals, or may include a timer such that.the signals are launched at predetermined time intervals (e.g., every half hour, every six hours, etc.).

Receiver unit 16 of monitoring system 10 is illustrated as including a photodetector unit 30 for receiving the plurality of N monitoring signals that have propagated along the plurality of spare fibers $24_1 – 24_N$. The remaining transmission fibers 28 from cable 26 are dispersed (in a manner not shown) to a plurality of other receivers or similar optical communication equipment. In accordance with the present invention, the power level of each received monitoring signal is measured, as illustrated by a plurality of threshold detectors $32_1, 32_2, \ldots, 32_N$ shown in receiver unit 16 of FIG. 1. The output of each threshold detector is shown as being applied as an input to a separate alarm unit 34, with the output of threshold detector $32_1$ applied as an input to alarm unit $34_1$, the output of threshold detector $32_2$ applied as an input to alarm unit $34_2$, and likewise, with the output of threshold detector $32_N$ applied as an input to alarm unit $34_N$. Each threshold detector $32_i$ is set to generate an alarm signal when there is either a complete loss of received signal, or the power level of the received signal is below the predetermined threshold level (for example, 30 dB). In response to the receipt of an alarm signal, the associated alarm unit $34_i$ will be activated, in the form of, for example, an audible signal, a visible indicator (such as a lamp), or a read-out on a computer terminal (e.g., "loss of signal on spare fiber 004" or the like). Any appropriate type of alarm signal may be used to indicate to a local technician at location 18 that a failure has occurred along one of the spare fibers $24_i$.

Figure 2:
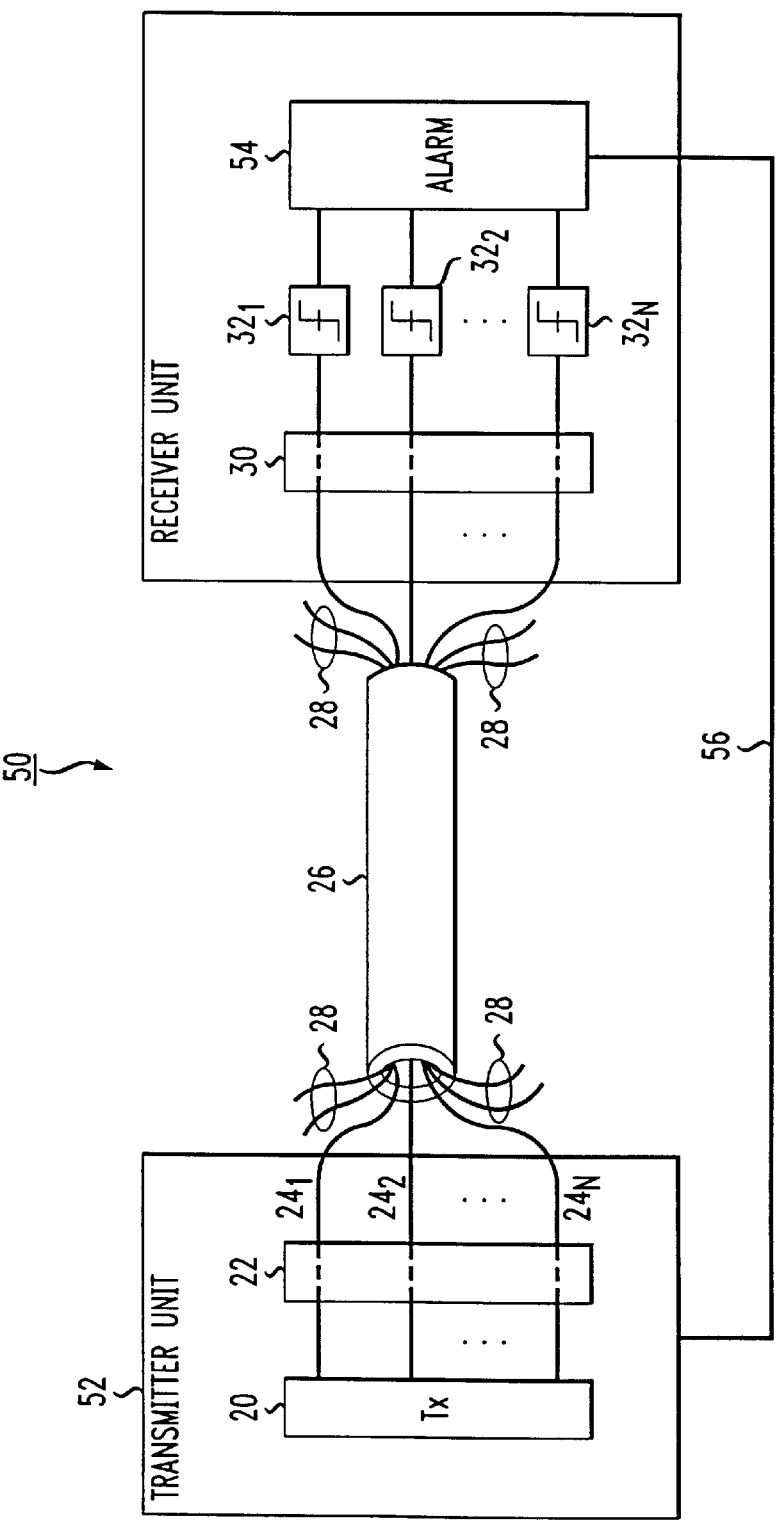
FIG. 2 illustrates an alternative spare fiber monitoring system of the present invention, this embodiment utilizing a remote alarm arrangement.

FIG. 2 illustrates an alternative spare fiber monitoring system 50 of the present invention, which in this case utilizes a telecommunications link 56 between a transmitter unit 52 and an alarm unit 54 to communicate an alarm condition back to transmitter unit 52. In particular, a separate alarm monitor 58 may be included in transmitter unit 52 and used to access the "alarm status" of the spare fibers at receiver unit 16. In this case, alarm unit 54 may or may not also provide a local alarm for technicians located at second location 18. The reception of an alarm signal at first location 14 can then be used to allow for a technician at the first location to repair or replace the failed spare fiber. Thus, by maintaining all spare fibers in working condition, this set of fibers is constantly available for use when an actual communication fiber experiences a failure condition.

The following claims are intended not only to cover the specific embodiments disclosed, but also to cover the inventive concepts explained herein with the maximum breadth and comprehensiveness permitted by the prior art.

What is claimed is:

1. An arrangement for continuously monitoring the transmission condition of a plurality of spare fibers within a fiber optic cable disposed between a first location and a second location, said cable comprising a plurality of transmission fibers and said plurality of spare fibers, the arrangement comprising:

a transmission unit disposed at the first location and including an optical source for providing an optical test signal input to each spare fiber of the plurality of spare fibers; and a receiver unit disposed at the second location and coupled to the plurality of spare fibers, said receiver unit including an optical threshold detector arrangement for receiving the plurality of test signals propagating along said plurality of spare fibers and generating an alarm signal identifying a spare fiber exhibiting an output signal below a predetermined threshold level.

2. The arrangement as defined in claim 1 wherein the fiber optic cable comprises a plurality of N spare fibers and the transmission unit comprises a plurality of N separate optical sources for providing test signal inputs to each spare fiber.

3. The arrangement as defined in claim 1 wherein the fiber optic cable comprises a plurality of N spare fibers and the transmission unit comprises a plurality of M separate optical sources and an M×N optical signal splitter for providing a plurality of N separate test signal inputs to said plurality of N spare fibers.

4. The arrangement as defined in claim 1 wherein the optical threshold detector arrangement includes a plurality of separate optical threshold detectors, each detector for receiving the output from a separate spare fiber and generating an alarm signal when the output signal falls below the predetermined threshold level.

5. The arrangement as defined in claim 1 wherein the receiver unit generates a local alarm signal at the second location when a spare fiber output signal falls below the predetermined threshold level.

6. The arrangement as defined in claim 1 wherein the arrangement further comprises a return communication path between the second location and the first location and the receiver unit generates a remote alarm signal that is transmitted over the return communication path to the first location when a spare fiber output falls below the predetermined threshold level.

7. A method of monitoring the transmission condition of a plurality of spare fibers within a fiber optic cable, the method comprising the steps of:

launching, at a first location, a test signal into each spare fiber within the fiber optic cable;

receiving, at a second distant location, the plurality of test signals propagating along the plurality of spare fibers;

comparing each received signal against a predetermined threshold level; and generating an alarm signal when any received signal falls below the predetermined threshold level.

8. The method as defined in claim 7 wherein in performing the launching, applying a continuous test signal.

9. The method as defined in claim 7 wherein the test signal is applied to the plurality of spare fibers at predetermined time intervals.

10. The method as defined in claim 7 wherein the alarm signal is generated at the second, distant location.

11. The method as defined in claim 7 wherein the comparing step occurs at the second, distant location and the alarm signal is transmitted back to the first location.

* * * * *